(12) United States Patent
Ito (10) Patent No.: US 11,550,594 B2
(45) Date of Patent: Jan. 10, 2023

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Koichi Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/693,127

(22) Filed: Nov. 22, 2019

(65) Prior Publication Data

US 2020/0174797 A1 Jun. 4, 2020

(30) Foreign Application Priority Data

Nov. 30, 2018 (JP) .............................. JP2018-225249

(51) Int. Cl.

| G06F 9/4401 | (2018.01) |
| G06F 11/20 | (2006.01) |
| G06F 9/448 | (2018.01) |
| G06F 11/07 | (2006.01) |
| G06F 9/48 | (2006.01) |

(52) U.S. Cl.
CPC .......... *G06F 9/4406* (2013.01); *G06F 9/4403* (2013.01); *G06F 9/4484* (2018.02); *G06F 9/4843* (2013.01); *G06F 11/076* (2013.01); *G06F 11/2023* (2013.01)

(58) Field of Classification Search
CPC .... G06F 9/4406; G06F 9/4484; G06F 9/4403; G06F 9/4843; G06F 11/076; G06F 11/2023

USPC ............................................................. 713/2
See application file for complete search history.

(56) References Cited

U.S. PATENT DOCUMENTS

| 4,831,517 | A | * | 5/1989 | Crouse ..................... G06F 8/66 714/6.13 |
| 5,621,885 | A | * | 4/1997 | Del Vigna, Jr. ..... G06F 11/1482 714/13 |
| 5,687,397 | A | * | 11/1997 | Ohmori ............. G11B 11/10597 369/13.11 |
| 5,835,695 | A | * | 11/1998 | Noll ..................... G06F 11/1417 714/6.1 |

(Continued)

FOREIGN PATENT DOCUMENTS

| JP | 2006099704 A | 4/2006 |
| JP | 2007304781 A | 11/2007 |

(Continued)

*Primary Examiner* — Paul R. Myers
(74) *Attorney, Agent, or Firm* — Canon U.S.A., Inc. IP Division (57) ABSTRACT

An information processing apparatus includes a storage unit configured to store at least a first boot program and a second boot program corresponding to the first boot program, a controller configured to read and execute a program, detect, in accordance with occurrence of a read error at reading of the first boot program, an address of a storage area storing a program in which the read error has occurred in the first boot program, and specify, from an address of a storage area storing the second boot program, an address corresponding to the detected address. The controller reads and executes the second boot program stored in the specified address.

13 Claims, 8 Drawing Sheets

(56) References Cited

U.S. PATENT DOCUMENTS

| | | | | |
|---|---|---|---|---|
| 6,615,404 B1* | 9/2003 | Garfunkel | G06F 8/654 | 717/173 |
| 6,757,838 B1* | 6/2004 | Chaiken | G06F 9/4403 | 714/15 |
| 7,484,084 B1* | 1/2009 | Ranaweera | G06F 8/656 | 713/1 |
| 8,065,563 B2* | 11/2011 | Lai | G06F 11/1417 | 714/36 |
| 10,353,852 B2* | 7/2019 | Kodera | G06F 3/0619 | |
| 10,409,507 B1* | 9/2019 | Huang | G06F 3/0652 | |
| 10,796,004 B1* | 10/2020 | Davis | G06F 21/64 | |
| 2003/0093643 A1* | 5/2003 | Britt, Jr. | G06F 8/658 | 711/170 |
| 2003/0093708 A1* | 5/2003 | Ali-Santosa | G06F 11/1433 | 714/4.1 |
| 2004/0025086 A1* | 2/2004 | Gorday | G01R 31/317 | 714/37 |
| 2004/0153846 A1* | 8/2004 | Lee | G06F 11/1417 | 714/42 |
| 2004/0199911 A1* | 10/2004 | Lo | G06F 8/654 | 717/171 |
| 2004/0210720 A1* | 10/2004 | Wong | G06F 9/328 | 711/132 |
| 2005/0125690 A1* | 6/2005 | Chin | G06F 9/3802 | 726/4 |
| 2005/0182922 A1* | 8/2005 | Guo | G06F 9/4843 | 713/1 |
| 2006/0236150 A1* | 10/2006 | Lintz | G06F 11/1417 | 714/6.13 |
| 2007/0028083 A1* | 2/2007 | Yu | G06F 8/66 | 713/1 |
| 2007/0028084 A1* | 2/2007 | Yu | H04L 67/34 | 713/1 |
| 2007/0028087 A1* | 2/2007 | Yu | G06F 9/30174 | 713/2 |
| 2007/0050611 A1* | 3/2007 | Weikel | G06F 9/4406 | 713/2 |
| 2007/0113064 A1* | 5/2007 | Wei | G06F 21/575 | 713/1 |
| 2007/0266202 A1* | 11/2007 | Mukaida | G06F 11/1068 | 711/103 |
| 2008/0008001 A1* | 1/2008 | Kuroyanagi | G11C 29/72 | 365/185.11 |
| 2008/0046637 A1* | 2/2008 | Katano | G06F 11/1417 | 711/103 |
| 2008/0313489 A1* | 12/2008 | Aissi | G06F 11/0793 | 714/E11.133 |
| 2009/0144538 A1* | 6/2009 | Duda | G06F 8/65 | 713/2 |
| 2009/0172467 A1* | 7/2009 | Araki | G06F 11/1068 | 714/6.12 |
| 2009/0271603 A1* | 10/2009 | Wang | G06F 11/1417 | 713/2 |
| 2009/0276614 A1* | 11/2009 | Huang | G06F 8/654 | 713/2 |
| 2010/0095104 A1* | 4/2010 | Lewis | G06F 11/1417 | 713/2 |
| 2011/0066920 A1* | 3/2011 | Yu | G06F 11/1064 | 714/758 |
| 2011/0252413 A1* | 10/2011 | Maeda | G06F 8/66 | 717/168 |
| 2012/0054475 A1* | 3/2012 | Lee | G06F 11/1417 | 713/1 |
| 2012/0239972 A1* | 9/2012 | Shibata | G06F 11/1417 | 714/15 |
| 2013/0145080 A1* | 6/2013 | Grandin | G06F 12/0246 | 711/103 |
| 2015/0074461 A1* | 3/2015 | Yu | G06F 11/1417 | 714/36 |
| 2015/0277894 A1* | 10/2015 | Pirvu | G06F 8/66 | 717/168 |
| 2015/0309803 A1* | 10/2015 | Sahu | G06F 11/1417 | 714/21 |
| 2015/0317152 A1* | 11/2015 | Todd | G06F 9/4484 | 717/168 |
| 2015/0324301 A1* | 11/2015 | Iizuka | G06F 11/1448 | 713/193 |
| 2016/0154700 A1* | 6/2016 | Tian | G06F 12/0653 | 714/15 |
| 2017/0322816 A1* | 11/2017 | Parthiban | G06F 9/4416 | |
| 2018/0101388 A1* | 4/2018 | Hummel | G06F 8/65 | |
| 2019/0172047 A1* | 6/2019 | Tan | G06Q 20/3263 | |

FOREIGN PATENT DOCUMENTS

| | | |
|---|---|---|
| JP | 2009-70224 A | 4/2009 |
| JP | 2015036847 A | 2/2015 |
| JP | 2015046088 A | 3/2015 |
| WO | 2011/001486 A1 | 1/2011 |

* cited by examiner

| start-up order → | 1 | 2 | 3 | 4 | 5 |
|---|---|---|---|---|---|
| | BOOT Loader | | | Kernel | |
| boot program 304 | 0xFF01 | 0xFF02 | ~~0xFF03~~ → | 0xFF04 | 0xFF05 |
| boot program 305 | 0xFFF1 | 0xFFF2 | 0xFFF3 | 0xFFF4 | 0xFFF5 |

INFORMATION PROCESSING APPARATUS, METHOD OF CONTROLLING INFORMATION PROCESSING APPARATUS, AND STORAGE MEDIUM

BACKGROUND

Field of the Disclosure

The present disclosure generally relates to an information processing apparatus and specifically relates to an information processing apparatus that reads and executes a boot program stored in a nonvolatile memory, such as a hard disk (HDD), a method of controlling the information processing apparatus, and a storage medium.

Description of the Related Art

Conventionally, a nonvolatile memory, such as an HDD, is installed as a storage unit in various information processing apparatuses (e.g., a personal computer (PC), a server, and an image forming apparatus). For example, an image forming apparatus has a nonvolatile memory, such as an HDD, as a storage destination for a boot program for starting up an operating system (OS) or for image data and an apparatus log of print job processing.

In a case where a read error of a boot program for starting up the OS occurs at start-up of an information processing apparatus due to an unexpected failure or the life of a nonvolatile memory, there is a possibility that the information processing apparatus cannot start up.

Japanese Patent Application Laid-Open No. 2009-70224 discusses a nonvolatile memory having a plurality of different storage areas in which identical boot programs are stored. Discussed is a method of re-starting a central processing unit (CPU), the nonvolatile memory, and a display unit in a case where a read error occurs in a boot program used at start-up, and reading the boot program in a different storage area in the nonvolatile memory, to start up an information processing apparatus. However, in a case where a read error occurs at reading of a boot program for starting up the OS from the nonvolatile memory and then the boot program stored in a different storage area is read and executed from the beginning, it may take time to start up the apparatus.

SUMMARY

According to an aspect of the present disclosure, an information processing apparatus in which a controller including at least one processor executes a boot program to start up an operating system includes a storage unit configured to store at least a first boot program and a second boot program, corresponding to the first boot program. The controller is configured to read and execute programs, detect, in accordance with occurrence of a read error at reading of the first boot program, an address of a storage area storing a program portion of the first boot program in which the read error has occurred, and specify, from an address of a storage area storing the second boot program, an address corresponding to the detected address. The controller reads and executes a program portion of the second boot program stored in the storage area of the specified address.

Further features of the present disclosure will become apparent from the following description of exemplary embodiments with reference to the attached drawings.

DESCRIPTION OF THE EMBODIMENTS

Each exemplary embodiment of the present disclosure will be described in detail with reference to the accompanying drawings. The disclosure according to the scope of the claims is not limited to the following exemplary embodiments, and not all combinations of features described in the exemplary embodiments are necessarily required for solutions for the present disclosure.

Figure 1:
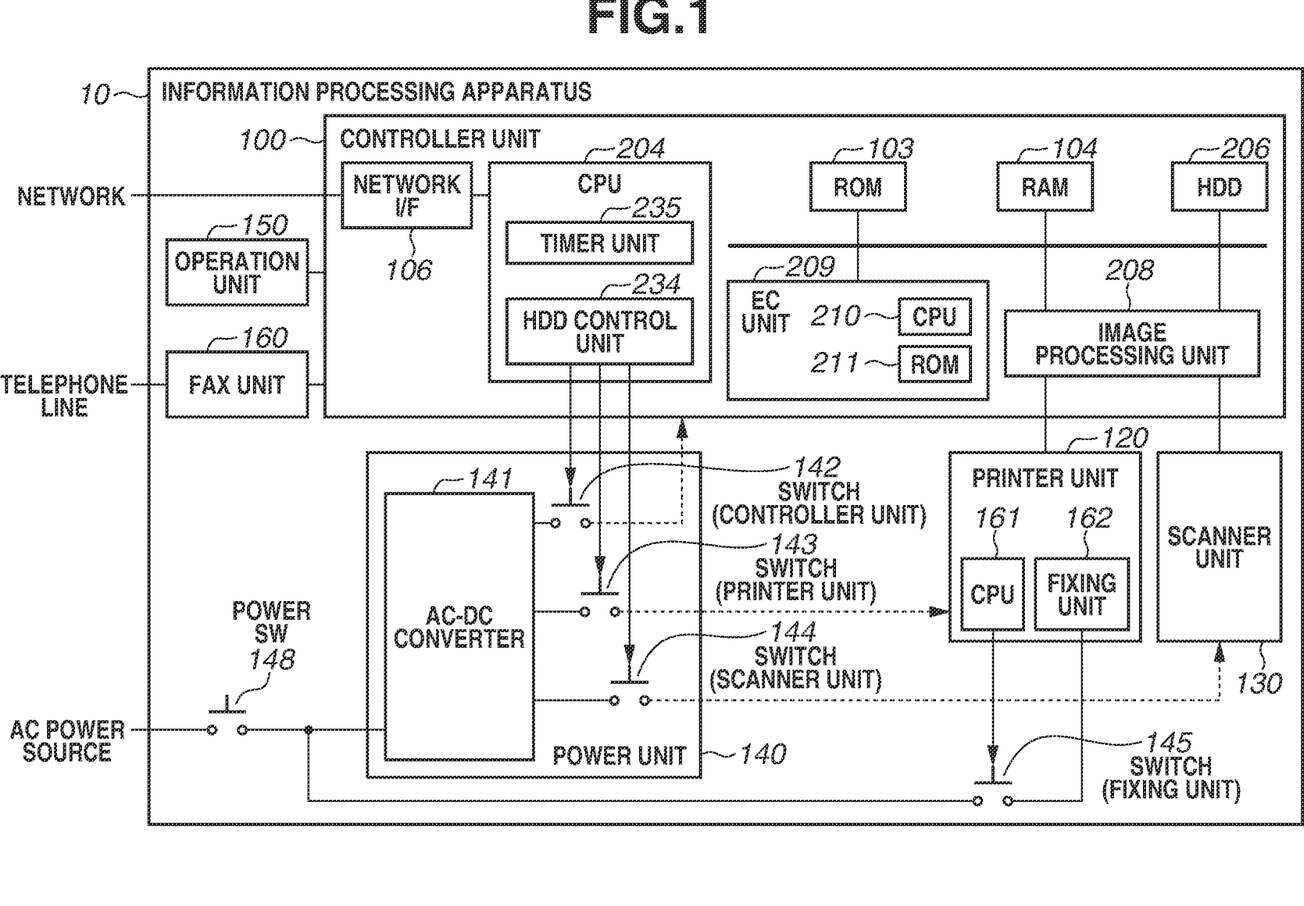
FIG. 1 is a block diagram of a configuration of system control of an information processing apparatus.

FIG. 1 is a block diagram of an exemplary configuration of an information processing apparatus 10 according to a first exemplary embodiment. The information processing apparatus 10 of FIG. 1 includes an operation unit 150, a facsimile (FAX) unit 160, a controller unit 100, a printer unit 120, a scanner unit 130, a power unit 140, a switch 145, and a switch (power SW) 148.

The controller unit 100 that is a central processing unit (CPU) system includes a CPU 204, a read-only memory (ROM) 103, a random-access memory (RAM) 104, a hard disk drive (HDD) 206, a network interface (I/F) 106, and an embedded controller (EC) unit 209.

The CPU 204 executes a software program stored in the RAM 104 to control the entire apparatus.

The ROM 103 stores, for example, a program for executing formation regarding start-up of the controller unit 100 and fixed parameters.

The RAM 104 is used to store, for example, a program or temporary data when the CPU 204 controls the information processing apparatus 10. The program or the temporary data to be stored in the RAM 104 is read from the ROM 103 or the HDD 206 to be described below.

The HDD 206 stores, as a main storage, a program to be executed by the CPU 204, a program management table to be described below, and various types of data. The program to be executed is, for example, a boot program (BOOT Loader 302 and Kernel 303) to be executed by the CPU 204 for start-up of the operating system (OS) at start-up of the information processing apparatus 10. The detailed descriptions of the boot program and the program management table will be given below.

Herein, an HDD is used as the storage, but an embedded multimedia card (eMMC), a Not AND (NAND) flash memory, or a Not OR (NOR) flash memory may be used.

The network I/F 106 performs transmission and reception of data through a network.

The power unit 140 supplies power to the information processing apparatus 10. When power is off, an alternating current (AC) power source is disconnected by the switch 148. When the switch 148 is turned on, the AC power source is connected to an alternating current to direct current (AC-DC) converter 141, resulting in generation of a direct current (DC) power source.

An instruction of the CPU 204 enables control of three independent power sources for the entire apparatus from the AC power source (power device). The supply of power to the controller unit 100 can be controlled by a switch 142. The supply of power to the printer unit 120 can be controlled by a switch 143. The supply of power to the scanner unit 130 can be controlled by a switch 144.

The other units and switches will be described.

The FAX unit 160 is capable of transmitting or receiving a digital image through, for example, a telephone line.

The operation unit 150 includes a touch operation panel or a display screen and keys. Various states (e.g., a copy status, settings, or an error display at occurrence of an error) of the information processing apparatus 10 are displayed on the display screen.

The scanner unit 130 reads an original to generate monochrome binary image data or polychrome multivalued image data. The scanner unit 130 is connected to the CPU 204 through a scanner control interface (I/F) not illustrated. The CPU 204 controls an image signal input from the scanner unit 130 through the scanner control I/F.

The printer unit 120 prints, for example, image data converted from page description language (PDL) data received through the network I/F 106 or the image data generated by the scanner unit 130, onto a sheet.

For example, the printer unit 120 includes a CPU 161 and a fixing unit 162. The fixing unit 162 fuses a toner image transferred onto a sheet, to the sheet by heat and pressure. In FIG. 1, the fixing unit 162 generates heat due to power supplied from the AC power source through the switch 145. The fixing unit 162 can be supplied with power through the AC-DC converter 141. The CPU 161 functions as a printer controller, using, for example, a RAM not illustrated. The CPU 161 is supplied with power through the AC-DC converter 141. The CPU 161 controls the supply of power to the fixing unit 162 using the switch 145.

The switch 148 is turned on or off for switching of whether power is to be supplied to the information processing apparatus 10.

The EC unit 209 includes a nonvolatile memory storing a boot program (Basic Input/Output System (BIOS)). The detailed description of the boot program will be given below.

An image processing unit 208 is connected to the CPU 204, the printer unit 120, and the scanner unit 130. The image processing unit 208 performs image processing, such as color space conversion, on a digital image output from the scanner unit 130, and outputs image processed data to the CPU 204. The image processing unit 208 performs image processing, such as color space conversion, based on image data read by the scanner unit 130 to perform conversion into bitmap data, and outputs the bitmap data to the printer unit 120.

The CPU 204 has a function of writing data into and reading data from the HDD 206 (HDD control unit 234). Herein, the CPU 204 is to perform a function of controlling an HDD. However, in a case where a different memory is used instead of the HDD, the CPU 204 is to perform a function of controlling the different memory. Further, the CPU 204 has a timer function of counting time (timer unit 235). In performing the timer function, the CPU 204 starts counting in accordance with the start-up of the information processing apparatus 10.

Figure 2:
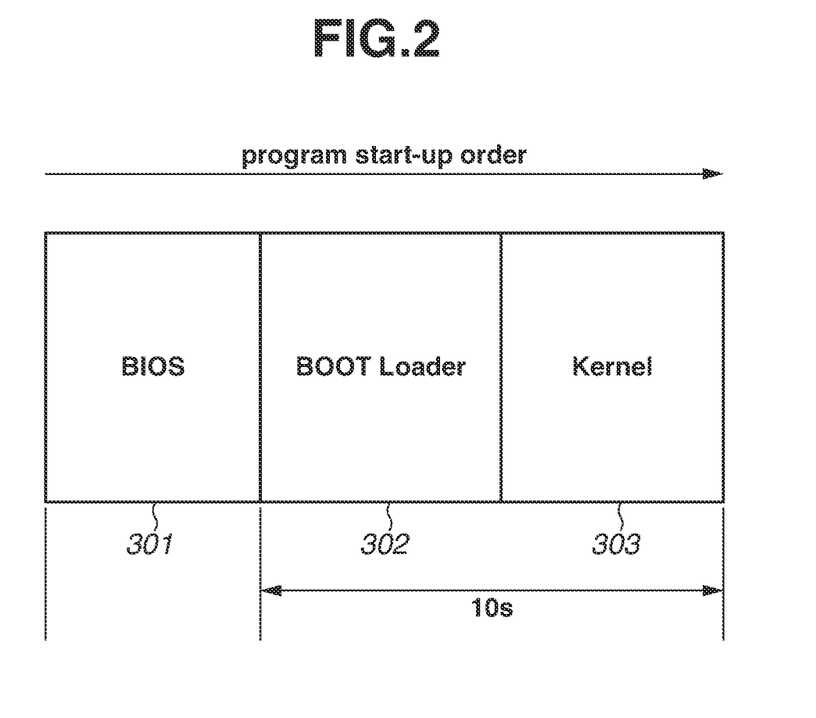
FIG. 2 is an explanatory diagram of the order of program start-up.

FIG. 2 illustrates the order of programs to be executed at the start-up of the information processing apparatus 10. At the start-up, an instruction for turning on the information processing apparatus 10 has been received.

A BIOS 301 is a program to be executed by the CPU 210 included in the EC unit 209 when power is turned on to the information processing apparatus 10. The BIOS 301 is stored in a ROM 211 included in the EC unit 209.

Execution of the BIOS 301 causes performance of processing regarding the start-up of the apparatus, for example, cancellation of the reset state of the CPU 204 supplied with power. In other words, the BIOS 301 is a program for starting up the CPU 204. The start-up of the CPU 204 causes the timer unit 235 of the CPU 204 to start counting time.

The BOOT Loader 302 is a program to be executed by the CPU 204 after execution of the BIOS 301, and is stored in the ROM 103. Execution of the BOOT Loader 302 starts up the OS, such as Linux®, stored in the HDD 206. Then, after the execution of the BOOT Loader 302, for example, the switch 143 is turned on, so that the printer unit 120 is supplied with power. Further, the BOOT Loader 302 initializes the operation unit 150 to enable rendering on the touch panel or the display screen.

The Kernel 303 is a program to be executed by the CPU 204 after completion of execution of the BOOT Loader 302, and is a program as the core for the OS. For example, the Kernel 303 manages the operation of other programs and a memory. Specific examples of the other programs include a program of controlling the I/F of the scanner, a program of controlling the I/F of the printer, and a start-up program.

After completion of execution of the Kernel 303, the CPU 204 determines that the start-up of the OS has been completed. When the CPU 204 determines that the start-up of the OS has been completed, the timer unit 235 of the CPU 204 ends counting time.

As described above, in FIG. 2, the BOOT Loader 302 and the Kernel 303 result in a boot program for starting up the OS.

Execution of the BIOS 301 starts up the CPU 204, and then the timer unit 235 starts counting time. In a case where execution of the boot program has not been completed at the elapse of a predetermined time after the start of the count, the boot program results in a read error. The predetermined time is set longer than the time necessary for execution of the boot program. For example, in a case where the time necessary for start-up is 10 seconds, a threshold value is set at 15 seconds.

In a case where the read error occurs, the timer unit 235 notifies the CPU 204 of a read error signal.

Figure 3A:
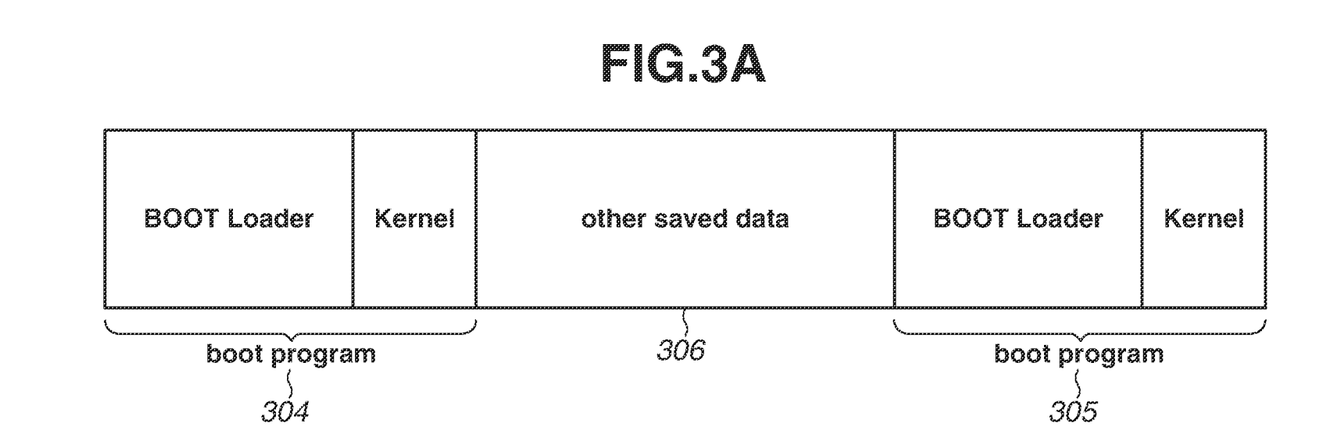
FIGS. 3A and 3B illustrate a configuration of boot programs and a configuration of a program management table, respectively.
Figure 3B:
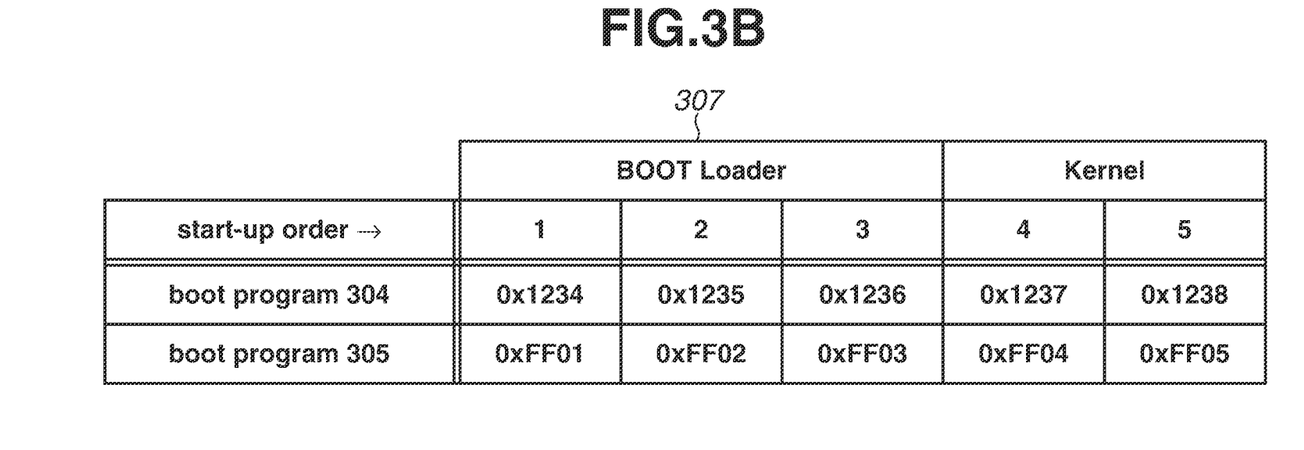

FIGS. 3A and 3B illustrate, respectively, a data configuration of the HDD 206 and a program management table stored in the HDD 206, according to the present exemplary embodiment.

In FIG. 3A, the HDD 206 stores a boot program 304, a boot program 305, and other saved data 306. The boot program 304 is the boot program for starting up the OS (BOOT Loader 302 and Kernel 303). The boot program 305 is the same as the boot program 304. The other saved data 306 includes, for example, set data of a user, image data generated by the scanner unit 130, and the program management table illustrated in FIG. 3B.

FIGS. 3A and 3B exemplify two identical boot programs having been stored. However, the number of identical boot programs can be more than two. As an exemplary boot program for starting up the OS, the BOOT Loader 302 and the Kernel 303 are provided. However, the present exemplary embodiment is not limited to this. All programs corresponding to the boot program for starting up the OS, to be executed after the start-up of the CPU 204, can be replicated.

According to the present exemplary embodiment, two identical boot programs are provided in the configuration. However, for example, two pieces of set data can be provided.

The "identical" boot programs used herein can be the boot programs that are substantially "identical". For example, even if one boot program is modified to the other boot program, the one boot program is regarded as being identical to the other boot program in a case where the one boot program achieves a function similar to the function of the other boot program.

The program management table 307 will be described with reference to FIG. 3B. The program management table 307 is stored in the HDD 206.

The program management table 307 indicates three blocks segmented from the BOOT Loader 302 and two blocks segmented from the Kernel 303 for each of the boot program 304 and the boot program 305, stored in different storage areas.

Each storage area (storage destination) is managed with an address, and respective start addresses are described in the management table. Each start address is managed in association with program start-up order. At program start-up, the programs are sequentially read and executed in order of start-up. The program content stored in the storage area of the boot program 304 and the program content stored in the storage area of the boot program 305 are identical at each start-up order in the program management table 307.

For example, the address of the BOOT Loader corresponding to start-up order 3 indicates "0x1236" for the boot program 304 and "0xFF03" for the boot program 305.

According to the present exemplary embodiment, the BOOT Loader is segmented into three blocks and the Kernel is segmented into two blocks. However, the present exemplary embodiment is not limited to this. In addition, although the addresses are consecutive, they can also be non-consecutive.

Figure 4:
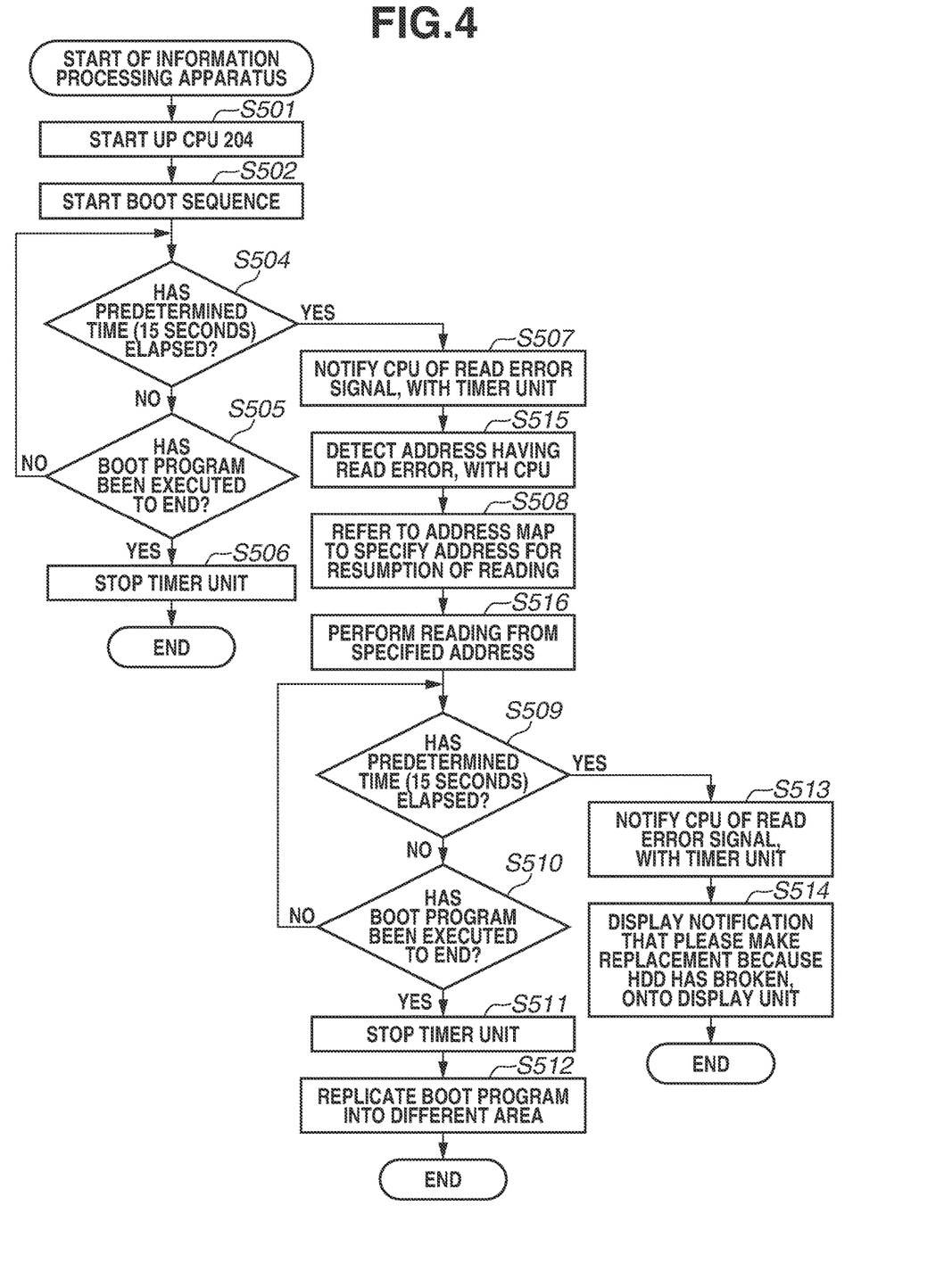
FIG. 4 is a flowchart for a read error of a boot program.

A start-up processing procedure since power is turned on to the information processing apparatus 10 according to the present exemplary embodiment will be described with reference to FIG. 4.

When power is turned on to the information processing apparatus 10, the processing in the flowchart starts.

In step S501, the EC unit 209 starts up the CPU 204 when power is turned on to the information processing apparatus 10.

In step S502, the CPU 204 starts counting time with the timer unit 235, and additionally reads and executes the boot program 304 from the HDD 206.

In step S504, the CPU 204 determines whether the time having been counted by the timer unit 235 is more than a predetermined time (e.g., 15 seconds). In a case where the predetermined time has not elapsed (NO in step S504), the processing proceeds to step S505.

In step S505, the CPU 204 determines whether the execution of the boot program has been completed. When the CPU 204 determines that the execution of the boot program has not been completed (NO in step S505), the processing returns to step S504. Meanwhile, in a case where the CPU 204 determines that the execution of the boot program has been completed (YES in step S505), the processing proceeds to step S506.

In step S506, the CPU 204 causes the timer unit 235 to stop counting time. After step S506, the processing in the flowchart ends, so that the information processing apparatus 10 is ready to be used. Referring back to step S504, the description will be given.

In step S504, in a case where the time having been counted by the timer unit 235 is more than the predetermined time (YES in step S504), the processing proceeds to step S507.

In step S507, in a case where the execution of the boot program has not been completed after the elapse of the predetermined time, a read error signal is generated to the CPU 204. Then, in step S515, the CPU 204 having received the read error signal detects an address in which the read error has occurred. The CPU 204 stops the timer unit 235 due to the generation of the read error signal.

In step S508, with reference to the program management table, CPU 204 specifies an address in the other boot program to correspond to the address in which the read error has occurred.

In step S516, the CPU 204 resumes reading and executing of a program from the address specified in step S508. For example, even when the program stored in the address, in which the read error has occurred, has been executed partway, the program stored in the specified address is read from the beginning.

After step S516, the CPU 204 replicates, into the HDD 206, the boot program in which no read error has occurred and deletes the boot program in which the read error has occurred. The replication can be made at any timing after step S516.

Figure 5A:
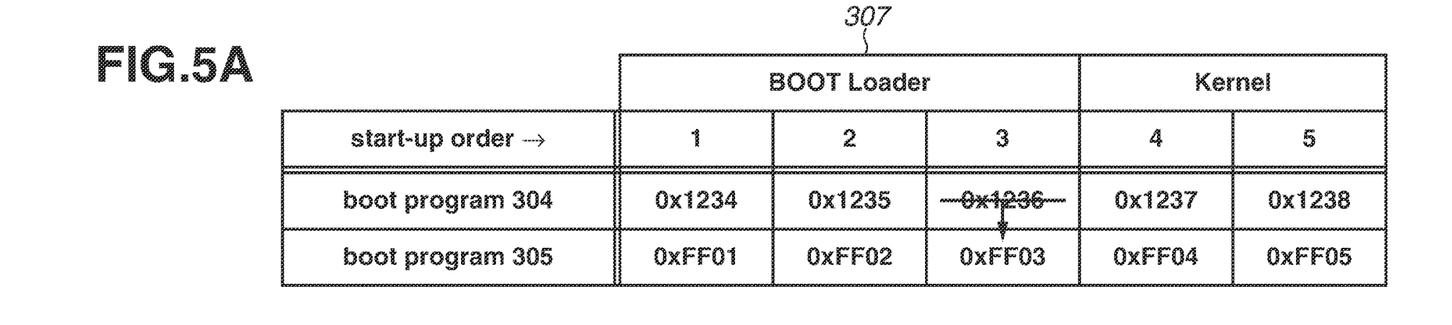
FIGS. 5A, 5B, and 5C illustrate a configuration of a program management table, a configuration of boot programs, and a configuration of a program management table, respectively.

Now, steps S507, S515, S508, and S516 will be specifically described with reference to FIG. 5A. FIG. 5A illustrates that the CPU 204 has received the read error signal during the execution of the boot program 304. In step S515, the CPU 204 detects that the read error has occurred in the program stored in an address 0x1236.

In step S508, the CPU 204 specifies an address 0xFF03 of the boot program 305 as an address corresponding to the address 0x1236 of the boot program 304.

In step S516, the CPU 204 reads and executes the program in order of the start-up from the address 0xFF03 of the boot program 305. Specifically, the boot program 305 is read and executed in order of an address 0xFF04 and an address 0xFF05 after the address 0xFF03. After the address 0xFF03, the boot program 304 can be read and executed in order of an address 0x1237 and an address 0x1238. After step S516, the processing proceeds to step S509.

In step S509, the CPU 204 verifies the time counted by the timer unit 235. In a case where the counted time is not more than the predetermined time (NO in step S509), the processing proceeds to step S510.

In step S510, the CPU 204 determines whether the boot program has been executed to the end. In a case where the CPU 204 determines that the boot program has not been executed to the end (NO in step S510), the processing returns to step S509. In a case where the CPU 204 determines that the boot program has been executed to the end (YES in step S510), the processing proceeds to step S511. In step S511, the timer unit 235 of the CPU 204 stops counting time. After step S511, the processing proceeds to step S512.

Figures 5B, 5C:
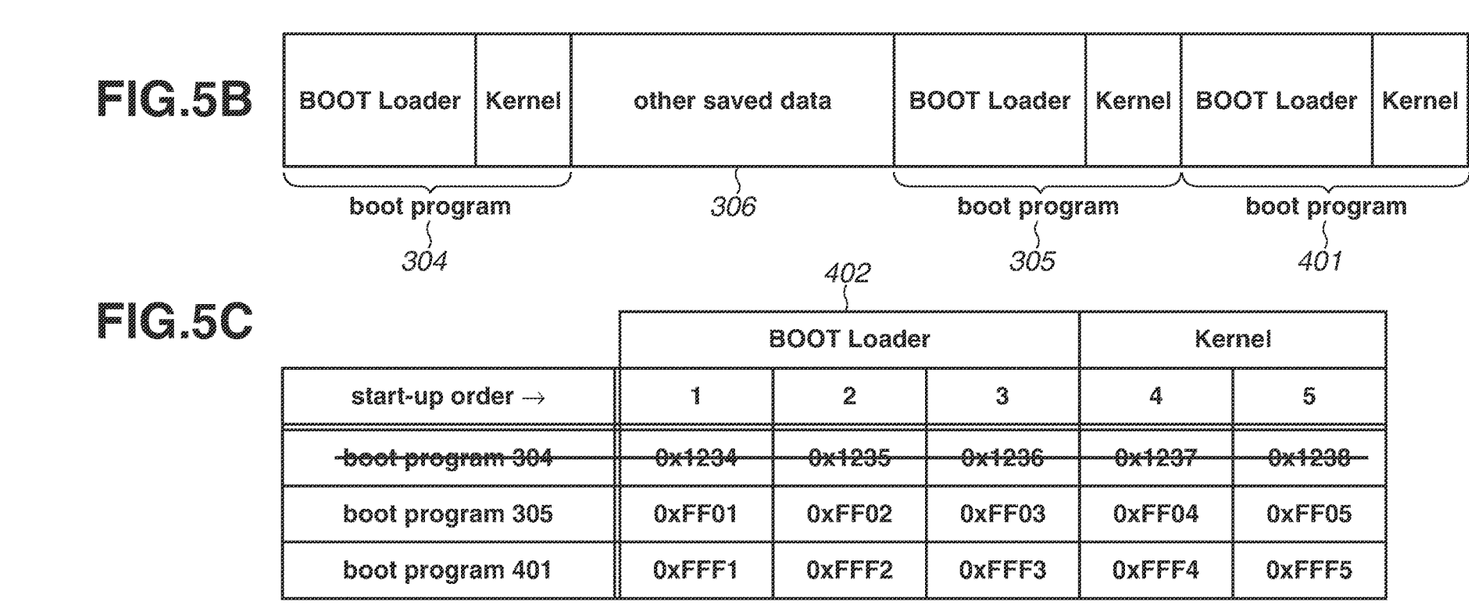

In step S512, the CPU 204 stores a boot program 401 into the HDD 206, as illustrated in FIGS. 5B and 5C. The boot program 401 is the same in content as the boot program 305 and the boot program 304. Herein, the boot program 401 is created by replication of the boot program 305.

Figure 6A:
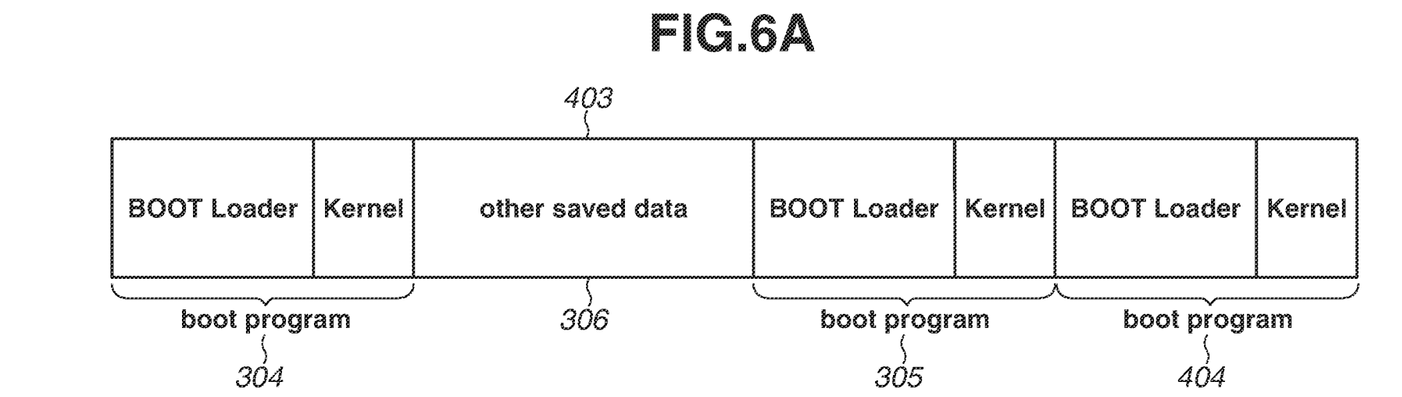
FIGS. 6A and 6B illustrate a configuration of boot programs and a configuration of a program management table, respectively.
Figure 6B:
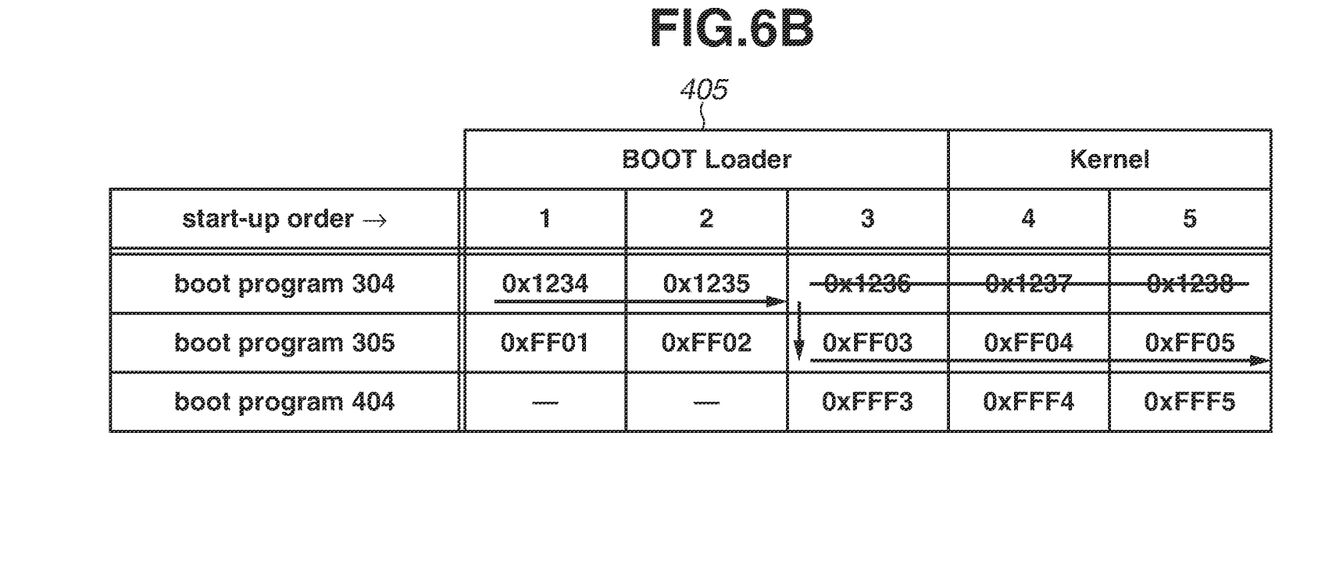

For example, a boot program 404 can be created by replication of the boot program 305 stored in an address corresponding to the address at the start-up order having the read error generated during reading of the boot program 304 and in an addresses after the corresponding address (refer to FIGS. 6A and 6B).

In this case, for the boot program 304, the program on and after the address, in which the read error has occurred, is deleted. Alternatively, the boot program 404 can be created by replication of only the boot program 305 stored in an address corresponding to the address at the start-up order having the read error generated during reading of the boot program 304 and in the subsequent address corresponding thereto. In this case, the CPU 204 deletes only the program stored in the address at the start-up order having the read error generated during reading of the boot program 304. The address, in which the program has been deleted, results in an unused area.

Replication in this manner enables provision of two identical boot programs at all times. Even if one boot program has a read error, this configuration enables start-up with the other boot program.

After step S512, the processing in the flowchart ends, so that the information processing apparatus 10 is ready to be used.

Referring back to step S509, the description will be given. In step S509, in a case where the verified time is more than the predetermined time (YES in step S509), the processing proceeds to step S513.

In step S513, the timer unit 235 of the CPU 204 notifies the CPU 204 of a read error signal.

In step S514, the CPU 204 displays a notification regarding the HDD, such as, for example, "The HDD has broken. Please make a replacement." onto the display screen of the operation unit 150. Then, the processing in the flowchart ends.

According to the present exemplary embodiment, the HDD 206 storing two identical boot programs has been exemplified in its configuration. However, for example, the HDD 206 can store three or more identical boot programs. For example, in a case three identical boot programs are stored in the HDD 206, the processing in steps S507, S515, S508, and S516 can be performed in accordance with YES in step S509. In other words, the processing in steps S504, S507, S515, S508, S516, and S509 can be performed by the number of identical boot programs.

According to the configuration of the present exemplary embodiment, even when a read error of the boot program for starting up the OS occurs due to an unexpected failure or the life of a nonvolatile memory, such as an HDD, the boot program requires no reading from the beginning. Thus, the time necessary for the start-up can be reduced.

A second exemplary embodiment is different from the first exemplary embodiment in terms of a method of specifying an address in another boot program corresponding to an address in which a read error has occurred. Herein, only the difference from the first exemplary embodiment will be described.

Figure 7:
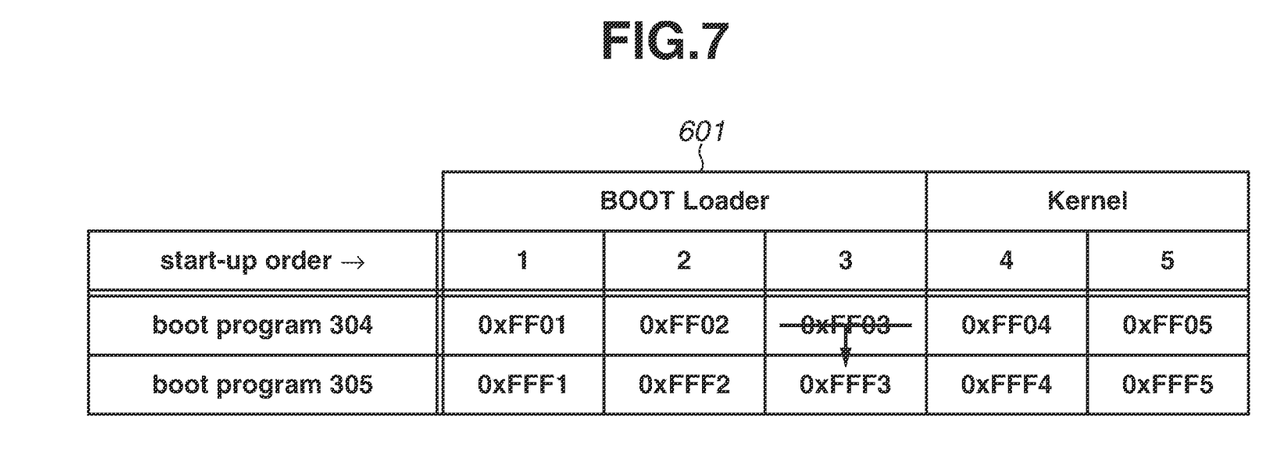
FIG. 7 illustrates a configuration of a program management table.

FIG. 7 illustrates a program management table 601 according to the present exemplary embodiment.

The start address of the program at each start-up order in the boot program 305 is an address in which a predetermined address is added to the start address of the program at each start-up order in the boot program 304. Specifically, for example, the address of the boot program 304 at start-up order 1 is an address 0xFF01, and the address of the boot program 305 at the start-up order 1 is an address 0xFFF1. That is the address 0xFFF1 of the boot program 305 results from addition of an address 0x00F0 to the address 0xFF01 of the boot program 304.

Figure 8:
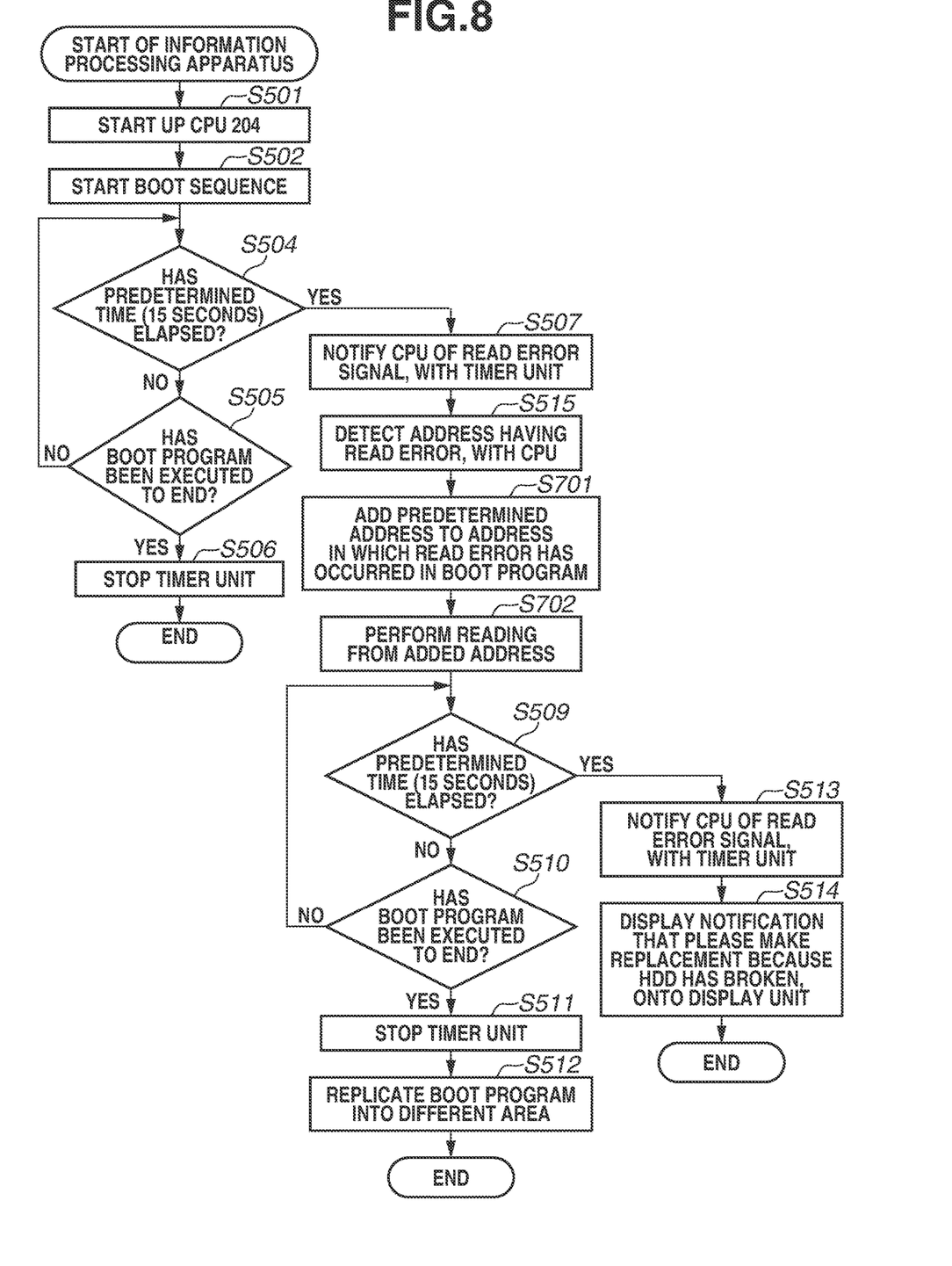
FIG. 8 is a flowchart for a read error of a boot program.

A start-up processing procedure since power is turned on to the information processing apparatus 10 according to the present exemplary embodiment will be described with reference to FIG. 8. Herein, steps S701 and S702, which are different from FIG. 4, will be described.

In step S515, the CPU 204 having received a read error signal detects an address in which a read error has occurred.

In step S701, a predetermined address is added to the detected address. After step S701, the processing proceeds to step S702. In step S702, reading of the program is resumed from the added address. After step S702, the processing proceeds to step S509.

According to the configuration of the present exemplary embodiment, even when a read error of the boot program for starting up the OS occurs due to an unexpected failure or the life of a nonvolatile memory, such as an HDD, the boot program requires no reading from the beginning. Thus, the time necessary for the start-up can be reduced.

The various examples and exemplary embodiments of the present disclosure have been given as above. However, the spirit and scope of the present disclosure are not limited to the specific descriptions in the present specification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-225249, filed Nov. 30, 2018, which is hereby incorporated by reference herein in its entirety.

What is claimed is:

1. An information processing apparatus in which a controller including at least one processor executes a boot program to start up an operating system, the information processing apparatus comprising:
a storage unit configured to divide a first boot program into segments and store the segments into a plurality of storage areas each of which has an address, and divide a second boot program into segments and store the divided segments of the second boot program into a plurality of storage areas each of which has an address, wherein the second boot program is same as the first boot program;
the controller configured to:
based on startup of the information processing apparatus, read and execute the segments stored in the plurality of storage areas where the first boot program is stored in turn;
detect an occurrence of a read error at reading of a first storage area of the plurality of storage areas where the first boot program is stored;
detect, upon detecting the occurrence of the read error of the first storage area, an address of the first storage area at which the read error has occurred; and
specify, from among the plurality of storage areas where the second boot program are stored, a second storage area where a same segment is stored as that of the first boot program stored in the first storage area,
wherein the segment of the second boot program stored in the specified second storage area is read and executed in place of the address at which the read error has occurred, and
wherein the controller is further configured to copy the second boot program stored in at least the second storage area to other storage area of the storage unit in a case where the read error occurs and a boot program is successfully executed by using the first boot program and the second boot program.

2. The information processing apparatus according to claim 1, wherein the storage unit stores a management table in which the first boot program and the second boot program are each managed, with each address of the plurality of the storage areas where the first boot program is stored and each address of the plurality of the storage areas where the second boot program being associated with a program start-up order, wherein the first boot program and the second boot program are divided such that contents of information stored, in the start-up order, are identical.

3. The information processing apparatus according to claim 2, wherein, in the management table, the address corresponding to the program portion start-up order is a start address of a program portion to be executed in predetermined order.

4. The information processing apparatus according to claim 2, wherein, after the controller reads and executes the second boot program portion stored in the storage area of the specified address, the controller sequentially reads and executes the second boot program portion corresponding to next start-up order of the specified address.

5. The information processing apparatus according to claim 2, wherein, after the controller reads and executes the second boot program portion stored in the storage area of the specified address, the controller sequentially reads and executes the first boot program stored in an address corresponding to next start-up order of the specified address.

6. The information processing apparatus according to claim 1, further comprising a replication unit configured to replicate and store a boot program into the storage unit,
wherein, based on completion of the execution of the boot program, the replication unit stores, into the storage unit, a third boot program resulting from replication of the second boot program portion stored in the specified address.

7. The information processing apparatus according to claim 1, further comprising a replication unit configured to replicate and store a boot program into the storage unit,
wherein, based on completion of the execution of the boot program, the replication unit stores, into the storage unit, a third boot program resulting from replication of the second boot program portion stored in the storage area of the specified address and in an address having start-up order after the specified address.

8. The information processing apparatus according to claim 1, further comprising a replication unit configured to replicate and store a boot program into the storage unit,
wherein, based on completion of the execution of the boot program, the replication unit stores, into the storage unit, a third boot program resulting from replication of the second boot program.

9. The information processing apparatus according to claim 1, further comprising:
a different storage unit configured to store a different boot program for starting up the processor; and
a different processor configured to start up the different boot program, the different processor being different from the processor,
wherein, when power is turned on to the information processing apparatus, the different processor executes the different boot program to start up the processor.

10. The information processing apparatus according to claim 9, further comprising a count unit configured to count time,
wherein the count unit starts counting time in accordance with the start-up of the processor, and
wherein, in a case where a count exceeds a threshold value before completion of execution of the first boot program, the read error occurs.

11. A method of controlling an information processing apparatus including a nonvolatile memory, and in which at least one processor executes a boot program to start up an operating system, the method comprising:
dividing a first boot program into segments and storing the segments into a plurality of storage areas in the memory, each of which has an address;
dividing a second boot program into segments and storing the divided segments of the second boot program into a plurality of storage areas in the memory, each of which has an address, wherein the second boot program is same as the first boot program;
controlling based on startup of the information processing apparatus, reading and executing the segments stored in the plurality of storage areas where the first boot program is stored in turn;
detecting, in accordance with occurrence of a read error at reading of a first storage area of the plurality of storage areas where the first boot program is stored;
detecting, upon detecting the occurrence of the read error of the first storage area, an address of the first storage at which the read error has occurred; and specifying, from among the plurality of storage areas where the second boot program are stored, a second storage area where a same segment is stored as that of the first boot program stored in the first storage area, wherein the segment of the second boot program stored in the specified second storage area is read and executed in place of the segment of the first boot program stored in the storage area of the address at which the read error has occurred, and wherein the second boot program stored in at least the second storage area to other storage area of the storage unit in a case where the read error occurs and a boot program is successfully executed by using the first boot program and the second boot program are copied.

12. A non-transitory computer-readable storage medium storing a program for causing a computer to execute the method according to claim 11.

13. The information processing apparatus according to claim 1, wherein, based on specifying the address where the same program as that of the address at which the read error has occurred is stored, the controller reads and executes the segment of the second boot program stored in the storage area of the specified address in place of the address at which the read error has occurred, without executing the second boot program from a start.

* * * * *